United States Patent
Chiang et al.

(10) Patent No.: US 7,864,056 B2
(45) Date of Patent: Jan. 4, 2011

(54) DEPOSITORY MONITORING SYSTEM IN SEMICONDUCTOR STORAGE WAREHOUSE

(75) Inventors: Wen-Hsiang Chiang, Hsinchu (TW); Tzu-Chung Fan, Hsinchu (TW); Shih-Ti Chi, Hsinchu (TW); Jui-Ching Huang, Hsinchu (TW); Shieng Chiang Fan, Hsinchu (TW); Chi-Ming Yi, Hsinchu (TW)

(73) Assignee: Chipmos Technologies Inc, Hsinchu (TW)

( * ) Notice: Subject to any disclaimer, the term of this patent is extended or adjusted under 35 U.S.C. 154(b) by 325 days.

(21) Appl. No.: 12/106,270

(22) Filed: Apr. 19, 2008

(65) Prior Publication Data

US 2009/0224920 A1    Sep. 10, 2009

(30) Foreign Application Priority Data

Mar. 6, 2008    (TW) .............................. 97107780 A

(51) Int. Cl.
*G08B 13/14* (2006.01)
(52) U.S. Cl. ............... 340/572.8; 340/572.1; 340/572.4
(58) Field of Classification Search ............. 340/572.1, 340/572.4, 572.7, 572.8, 571.1, 568.1, 5.8; 235/376, 380, 383, 385
See application file for complete search history.

(56) References Cited

U.S. PATENT DOCUMENTS

| | | | | |
|---|---|---|---|---|
| 4,827,110 A | * | 5/1989 | Rossi et al. | ................. 235/376 |
| 4,888,473 A | * | 12/1989 | Rossi et al. | ................. 235/376 |
| 6,330,971 B1 | | 12/2001 | Mabry et al. | |
| 7,158,850 B2 | * | 1/2007 | Cheng et al. | ................. 700/121 |
| 2006/0043197 A1 | | 3/2006 | Chang et al. | |
| 2008/0030341 A1 | * | 2/2008 | Zhuang | ................... 340/572.7 |

FOREIGN PATENT DOCUMENTS

TW    I267029    11/2006

\* cited by examiner

*Primary Examiner*—Van T. Trieu
(74) *Attorney, Agent, or Firm*—Ming Chow; Sinorica, LLC

(57) ABSTRACT

A depository monitoring system for use in a semiconductor factory comprises a plurality of carriers, each holding at least one semiconductor object; a depository monitoring host for monitoring a depository of each carrier; and a plurality of RFID tags and a plurality of RFID readers. It is characterized in that the RFID tags are disposed on the carriers and/or semiconductor objects, respectively, wherein each RFID tag has a tag information; the RFID readers read/write the tag information from/to the RFID tags; and the depository monitoring host comprises: a legacy database to store information related to the depository monitoring system; an RFID middleware for processing operations between the RFID readers and the RFID tags; a web interface for processing commands and query results through a B2B internet; an input/output interface for processing commands and query results through an intranet; and a depository controller for performing a sequence of processes in depository monitoring.

12 Claims, 5 Drawing Sheets

DEPOSITORY MONITORING SYSTEM IN SEMICONDUCTOR STORAGE WAREHOUSE

BACKGROUND OF THE INVENTION

1. Technical Field

The present invention relates to a depository monitoring system and, more particularly, to a depository monitoring system integrated with radio frequency identification (RFID) techniques.

2. Description of Related Art

Prior art in relation to wafer inventory or transport using RFID techniques are disclosed in U.S. Pat. No. 6,330,971 (hereinafter referred to as '971), U.S. Patent Application Publication No. 20060043197 (hereinafter referred to as '197) and Taiwan Patent No. 1267029 (hereinafter referred to as '029). The '971 patent provides a wafer tracking system using RFID techniques, as shown in FIG. 1A, in which a system 10 comprises a plurality of wafer-carried carriers 11, an RFID reader 12, an RFID tag 14 mounted on each of the carriers 11, and a controller 13. The RFID reader 12 reads the RFID tag 14 mounted on each of the carriers 11 through a plurality of antennas 15 connected thereto, and then sends a tag information read from the RFID tag 14 to the controller 13 via an RS-232 interface, thereby providing information regarding present locations of the carriers 11 and wafers carried thereon.

The '197 patent application provides a wafer transport system using a carrier integrated with RFID techniques, as shown in FIG. 1B, in which a system 100 comprises a transport device 110, a carrier 111 for carrying wafers, a processing tool 115, an RFID reader 116 and a tool controller 117. When the carrier 111 is transported to the processing tool 115 by the transport device 110, the RFID reader 116 which is mounted on the processing tool 115 reads an RFID tag 114 mounted on a carrier body 112 for sending a carrier identification code stored in the RFID tag 114 to the tool controller 117; thereby performing the processing tool 115 to process wafers in the carrier 111.

The '029 patent provides a wafer transport system using a carrier integrated with RFID techniques, as shown in FIG. 1C, in which a transport system 1000 comprises a wafer cassette 1010, an RFID tag 1020 attached to the wafer cassette 1010, a transport device 1030, a processing tool 1040, an RFID reader 1050, a host 1060 and a trigger 1070. When the RFID tag 1020 of the wafer cassette 1010 appears in the vicinity of the processing tool 1040, an RFID interrogator can directly retrieve information from the RFID tag 1020 and automatically activate the transport device 1030. As a result, the wafer cassette 1010 may be mistakenly transported to a port by a mechanical arm, thereby injuring an operator. However, the operator can give instructions to the host 1060 by directly operating the trigger 1070, so as to control the timing of information retrieval by the RFID interrogator. Therefore, the mechanical arm will not be accidentally activated by untimely retrieval of information from the RFID tag 1020 by the RFID interrogator, and the operator's safety is thus secured.

While the prior art mentioned above uses RFID techniques to transport or track wafers, the RFID techniques are not effectively integrated with an information system for depository monitoring. As a result, a wafer-based depository cannot be monitored in real time by the operator. Therefore, it is a pressing issue in relevant industries to integrate RFID techniques into an information system for depository monitoring, so that the operator can perform on-line and real-time management of a depository of semiconductor products and a semiconductor testing schedule.

SUMMARY OF THE INVENTION

In order to conduct real-time wafer-based depository monitoring of carriers or semiconductor objects and thereby make up for the shortcomings of prior art, the present invention provides a depository monitoring system integrated with RFID techniques, wherein the depository monitoring system comprises a plurality of carriers; a depository monitoring host for monitoring a depository of each said carrier or an object held therein; a plurality of RFID tags and a plurality of RFID readers. The carriers are disposed in a predetermined space of a semiconductor factory, wherein each said carrier holds at least one semiconductor object. The RFID tags are attached to the carriers or the semiconductor objects, respectively, wherein each said RFID tag has a tag information. The RFID readers are distributed in the predetermined space of the semiconductor factory for reading and writing the tag information from and to the RFID tags via radio frequency. The depository monitoring host is used to monitor the depository of each said carrier or semiconductor object and comprises: a legacy database for storing information related to the depository monitoring system; an RFID middleware for processing operations between the RFID readers and the RFID tags; a web interface for processing commands given by an operator through a B2B internet and outputting corresponding query results through the B2B internet; an input/output interface for processing commands given by the operator through an intranet and outputting corresponding query results through the intranet; and a depository controller for processing data storage and retrieval between the legacy database and the RFID middleware, the web interface and the input/output interface, so as to execute a sequence of processes regarding depository monitoring. Thus, an operator in the semiconductor factory can conduct on-line wafer-based depository monitoring of the carriers or semiconductor objects.

Therefore, a primary objective of the present invention is to provide a depository monitoring system integrated with RFID techniques, so that the operator or the system can monitor depository information of semiconductor objects using the RFID techniques in an on-line and real-time manner.

A second objective of the present invention is to provide a depository monitoring system integrated with RFID techniques, wherein an RFID tag can be coded as an index for searching, so that upstream and downstream manufactures can monitor present locations, conditions and test results of semiconductor objects in real time through an intranet.

A third objective of the present invention is to provide a depository monitoring system integrated with RFID techniques, wherein an RFID tag can be coded as an index for searching, so that an operator can retrieve a semiconductor product in real time through an intranet.

A fourth objective of the present invention is to provide a depository monitoring system integrated with RFID techniques, whereby an operator is allowed to monitor latest test results of semiconductor objects and conduct scheduling management of production lines in real time through an intranet.

A fifth objective of the present invention is to provide a depository monitoring system integrated with RFID techniques, whereby an operator in charge of goods receiving and shipping or assigned to an access control zone of a building can monitor inbound and outbound flows of semiconductor products in real time through an intranet.

BRIEF DESCRIPTION OF THE DRAWINGS

The invention as well as a preferred mode of use, further objectives and advantages thereof will best be understood by reference to the following detailed description of illustrative embodiments when read in conjunction with the accompanying drawings, wherein.

DETAILED DESCRIPTION OF THE PREFERRED EMBODIMENT

The present invention provides a depository monitoring system integrated with RFID techniques that allows an operator to conduct real-time wafer-based depository monitoring of carriers or semiconductor objects as well as production line management. Now that a person of ordinary skill in the art would readily understand the wafer testing procedure and the RFID theory involved in the present invention, a complete description thereof will not be given herein. Besides, drawings referred to in the following description are not drawn according to actual dimension and it is not necessary to do so because the drawings are intended to only schematically demonstrate structures related to features of the present invention.

Figure 1A:
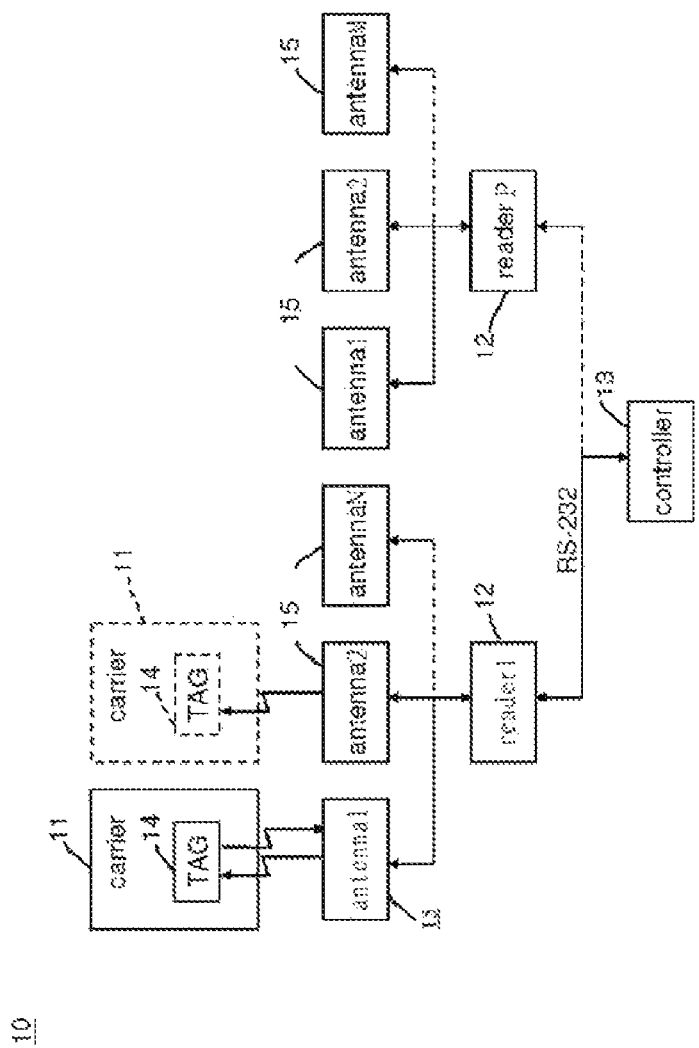
FIGS. 1A to 1C are block diagrams showing wafer systems integrated with RFID techniques according to prior art.
Figure 1B:
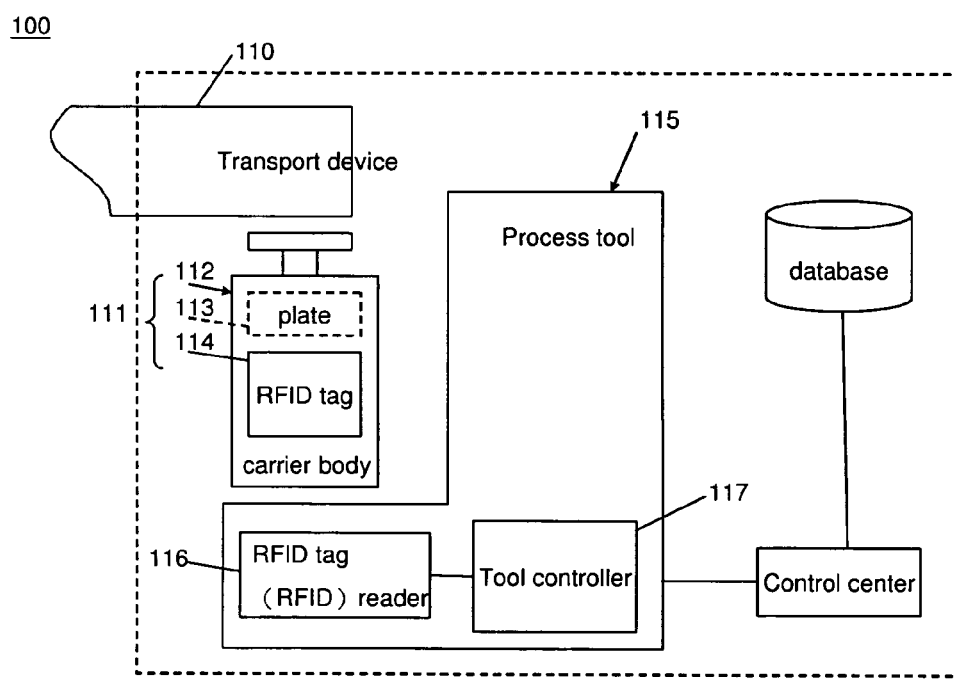
Figure 1C:
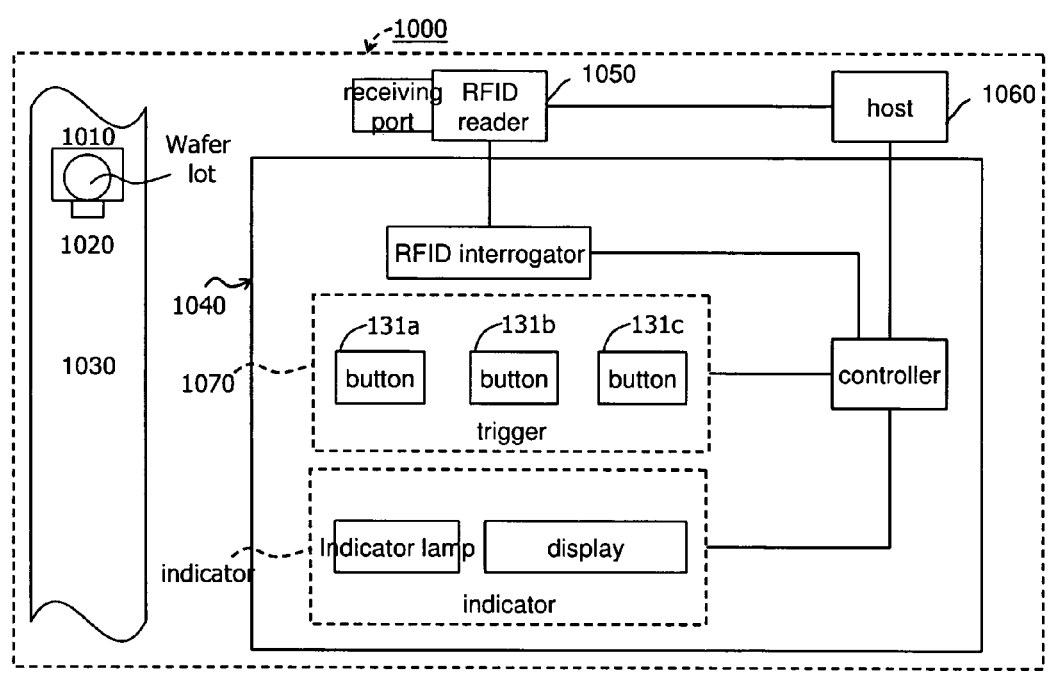
Figure 2:
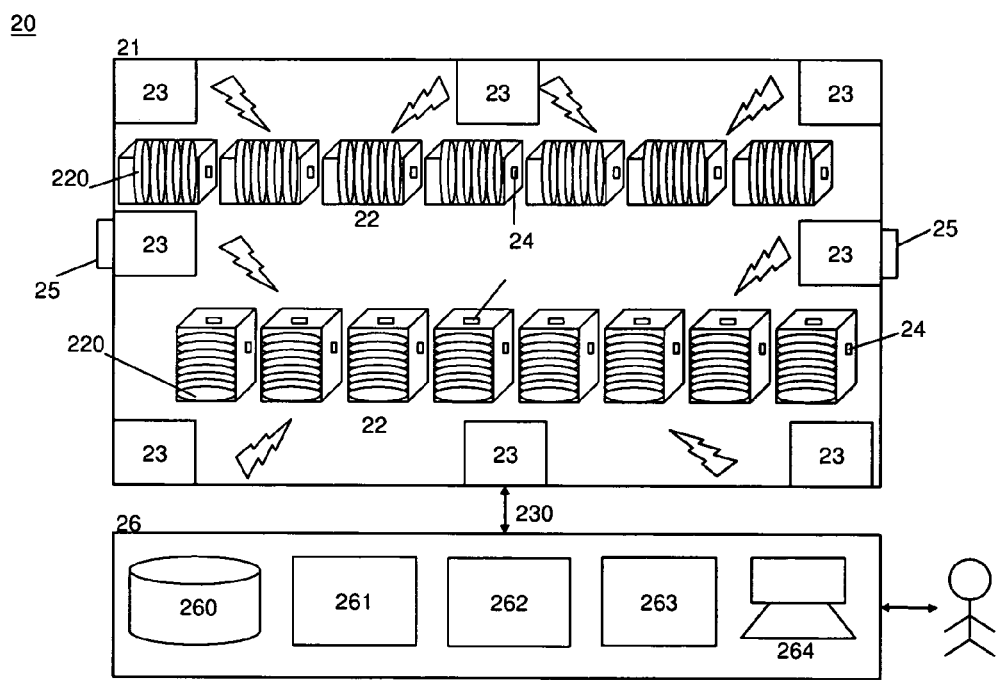
FIG. 2 is a schematic drawing of a depository monitoring system integrated with RFID techniques according to a first preferred embodiment of the present invention.

Referring to FIG. 2 for a first preferred embodiment of the present invention, which is a depository monitoring system 20 integrated with RFID techniques for use in a semiconductor factory 21. The depository monitoring system 20 comprises a plurality of carriers 22, a depository monitoring host 26, a plurality of RFID tags 24 and a plurality of RFID readers 23. The carriers 22 are disposed in a predetermined space (i.e., a specific plant or working area) in the semiconductor factory 21, wherein each said carrier 22 is used to hold at least one semiconductor object 220, which can be a wafer, a probe or a mask, while each said carrier 22 for holding the semiconductor object 220 can be a wafer cassette, a front-opening unified pod (FOUP), a front-opening shipping box (FOSB), a trolley or a probe card box. The plurality of RFID readers 23 are distributed in the semiconductor factory 21 and each said carrier 22 and/or object 220 is attached with several said RFID tags 24 in different directions thereof so as to ensure that a tag information in each said RFID tag 24 can be read or written by the RFID readers 23 within a radio frequency range in the predetermined space. The tag information includes, for example, a tag ID, a carrier or Lot ID, a customer ID, a wafer part ID, a wafer ID, a wafer quantity, a good die quantity and a probe card ID. Moreover, the RFID tags 24 can be passive or active. Thus, the depository monitoring host 26 allows an operator to monitor depository information of each said carrier 22 or semiconductor object 220 in real time.

In this embodiment, the depository monitoring host 26 is characterized in comprising a legacy database 260, an RFID middleware 261, a web interface 262, a depository controller 263 and an input/output interface 264. The legacy database 260 is used to store depository information such as an ID, quantity, condition and location associated with the carriers 22 or the semiconductor objects 220. More particularly, the depository information includes, for example, a carrier or Lot ID, a customer ID, a wafer part ID, a wafer ID, a wafer quantity, a good die quantity, a probe card ID, a carrier or object storing location, a wafer processing information, a wafer test result and a probe card record. The RFID middleware 261 is used to process operations between the RFID readers 23 and the RFID tags 24. In addition, the RFID middleware 261 performs data transmission between the depository monitoring host 26 and the RFID readers 23 via a driver program 230 and a data transmission protocol selected from a plurality of wired or wireless transmission standards including, for example, RS-232, Ethernet, USB and WLAN. Meanwhile, the RFID middleware 261 also processes data reading and writing between the RFID readers 23 and the RFID tags 24. The web interface 262 allows the operator to give commands through a B2B internet and outputs corresponding query results through the B2B internet. For example, the operator can search for depository information or a processing information of a semiconductor object 220 of a particular customer through the B2B internet. The input/output interface 264 can be connected to a plurality of external input and output devices and serve as an interface through which the operator gives commands and corresponding query results are outputted. The depository controller 263 processes data transmission between the legacy database 260 and the RFID middleware 261, the web interface 262 and the input/output interface 264, so as to execute a sequence of processes regarding depository monitoring.

In this embodiment, the RFID middleware 261 can further provides an index key (not shown) to the depository controller 263, so that the depository controller 263 can perform data storage and retrieval into and from the legacy database 260 according to the index key. For example, the operator can use a carrier Lot ID as a primary index key and a wafer ID as a secondary index key to search through the legacy database 260 in an on-line manner for information regarding a present location of that particular wafer. The index keys are retrieved from a tag information by the RFID middleware 261. In other words, the index keys are a combination of, for example, a tag ID, a carrier or Lot ID, a customer ID, a wafer part ID, a wafer ID and a probe card ID. Furthermore, the RFID readers 23 can be further provided with an alarm device 25 in the vicinity thereof, such as installed in an access control area of the semiconductor factory 21, so that the operator can monitor and track a latest condition of the semiconductor objects 220 and the carriers 22 in real time.

Figure 3:
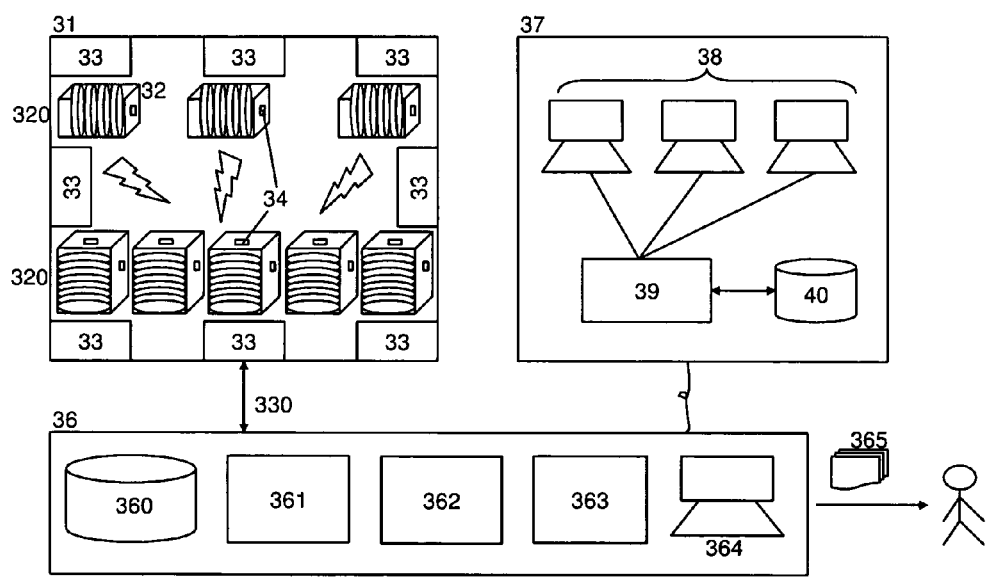
FIG. 3 is a schematic drawing of a depository monitoring system based on the system shown in FIG. 2 according to a second preferred embodiment of the present invention.

Referring to FIG. 3 for a second preferred embodiment of the present invention, which is a depository monitoring system 30 integrated with RFID techniques for use in a semiconductor factory 31. The depository monitoring system 30 comprises a plurality of carriers 32, a depository monitoring host 36, a plurality of RFID tags 34, a plurality of RFID readers 33 and a facility testing section 37. The carriers 32 are disposed in a predetermined space (i.e., a specific plant or working area) in the semiconductor factory 31, wherein each said carrier 32 is used to hold at least one semiconductor object 320, which can be a wafer, a probe or a mask, while each said carrier 32 for holding the semiconductor object 320 can be a wafer cassette, a front-opening unified pod (FOUP), a front-opening shipping box (FOSB), a trolley or a probe card box. The plurality of RFID readers 33 are distributed in the semiconductor factory 31 and each said carrier 32 or semiconductor object 320 is attached with several said RFID tags 34 in different directions thereof so as to ensure that a tag information in each said RFID tag 34 can be read or written by the RFID readers 33 within a radio frequency range in the predetermined space. The tag information includes, for example, a tag ID, a carrier or Lot ID, a customer ID, a wafer part ID, a wafer ID, a wafer quantity, a good die quantity and a probe card ID. Moreover, the RFID tags 34 can be passive or active. The depository monitoring host 36 is further connected to the facility testing section 37, which comprises a plurality of testers 38, an on-line testing system 39 and a test database 40. The on-line testing system 39 provides testing parameters necessary to the testers 38 and monitors wafer/probe card conditions. The test database 40 stores testing parameters or processing information related to wafer processes, and wafer test results. Thus, the on-line testing system 39 can provide the operator with a present condition of relevant testing equipment in real time, while integrating a real-time wafer/probe card depository information generated by the depository monitoring host 36 via RFID, so that an available resources report 365 is produced and the operator is thereby allowed to arrange scheduling for wafer tests in advance and conduct an automatic setup.

In this embodiment, the depository monitoring host 36 comprises a legacy database 360, an RFID middleware 361, a web interface 362, a depository controller 363 and an input/output interface 364. The legacy database 360 is used to store depository information such as an ID, quantity, condition and location associated with the carriers 32 or the semiconductor objects 320. More particularly, the depository information includes, for example, a carrier or Lot ID, a customer ID, a wafer part ID, a wafer ID, a wafer quantity, a good die quantity, a probe card ID, a carrier or object location, a wafer processing information, a wafer test result and a probe card record. The RFID middleware 361 is used to process operations between the RFID readers 33 and the RFID tags 34. In addition, the RFID middleware 361 performs data transmission between the depository monitoring host 36 and the RFID readers 33 via a driver program 330 and a data transmission protocol selected from a plurality of wired or wireless transmission standards including, for example, RS-232, Ethernet, USB and WLAN. Meanwhile, the RFID middleware 361 also processes data reading and writing between the RFID readers 33 and the RFID tags 34. The web interface 362 allows the operator to give commands through a B2B internet and outputs corresponding results through the B2B internet. For example, the operator can search for depository information or a processing information of a semiconductor object 320 of a particular customer through the B2B internet. The input/output interface 364 can be connected to a plurality of external input and output devices and serve as an interface through which the operator gives commands and corresponding query results are outputted. The depository controller 363 processes data transmission between the legacy database 360 and the RFID middleware 361, the web interface 362 and the input/output interface 364, so as to execute a sequence of processes regarding depository monitoring.

In this embodiment, the RFID middleware 361 can further provides an index key (not shown) to the depository controller 363, so that the depository controller 363 can perform data storage and retrieval into and from the legacy database 360 according to the index key. For example, the operator can use a carrier Lot ID as a primary index key and a wafer ID as a secondary index key to search through the legacy database 360 in an on-line manner for information regarding a present location of that particular wafer. The index keys are retrieved from a tag information by the RFID middleware 361. In other words, the index keys are a combination of, for example, a tag ID, a carrier or Lot ID, a customer ID, a wafer part ID, a wafer ID and a probe card ID.

The present invention has been described with preferred embodiments thereof and it is understood that these embodiments are not intended to limit the scope of the present invention. Moreover, as the content disclosed herein should be readily understood and can be implemented by a person skilled in the art, all equivalent changes or modifications which do not depart from the spirit of the present invention are encompassed by the appended claims.

What is claimed is:

1. A depository monitoring system integrated with radio frequency identification (RFID) techniques for use in a semiconductor factory, comprising:
    a plurality of carriers, disposed in a predetermined space in the semiconductor factory, wherein each said carrier holds at least one semiconductor object;
    a depository monitoring host, for monitoring a depository of each said carrier and semiconductor object; and
    a plurality of RFID tags and a plurality of RFID readers;
    the system being characterized in that:
    the plurality of RFID tags are attached to the carriers or the semiconductor objects, respectively, wherein each said RFID tag has a tag information;
    the plurality of RFID readers are distributed in the semiconductor factory for reading or writing the tag information from or into each said RFID tag via radio frequency; and
    the depository monitoring host comprises:
    a legacy database, for storing a depository information related to each said carrier or semiconductor object;
    an RFID middleware, for processing operations between the RFID readers and the RFID tags;
    a web interface, for processing commands given by an operator through a B2B (business-to-business) internet and outputting corresponding query results through the B2B internet;
    an input/output interface, for processing commands given by the operator through an intranet and outputting corresponding query results through the intranet; and
    a depository controller, for processing data storage and retrieval between the legacy database and the RFID middleware, the web interface and the input/output interface, so as to execute a sequence of processes regarding depository monitoring;
    wherein the RFID middleware further provides an index key to the depository controller, the depository controller conducts data storage and retrieval in and from the legacy database according to the index key that further includes a primary key and a secondary key;
    wherein the depository monitoring host is further connected to a facility testing section so that it is allowed to arrange scheduling for wafer tests in advance and to conduct an automatic setup when an available resources report has been received.

2. The depository monitoring system integrated with RFID techniques as claimed in claim 1, wherein each said semiconductor object can be a mask, a wafer or a probe card.

3. The depository monitoring system integrated with RFID techniques as claimed in claim 1, wherein the depository information includes location information of each said carrier or semiconductor object in a receiving dock, a shipping dock, a tester, nitrogen gas (N2) cabinet, a slide-rail cart, a trolley, a carrier cart or a building.

4. The depository monitoring system integrated with RFID techniques as claimed in claim 1, wherein the tag information includes a tag ID, a carrier or Lot ID, a customer ID, a wafer part ID, a wafer ID, a wafer quantity, a good die quantity and a probe card ID.

5. The depository monitoring system integrated with RFID techniques as claimed in claim 4, wherein the data transmission protocol is selected from the group consisting of RS-232, Ethernet, Universal Serial Bus (USB) and Wireless Local Area Network (WLAN).

6. The depository monitoring system integrated with RFID techniques as claimed in claim 1, wherein the RFID middleware further comprises a data transmission protocol and a driver program for conducting data transmission between the depository monitoring host and the RFID readers.

7. The depository monitoring system integrated with RFID techniques as claimed in claim 1, wherein each said RFID tag can be passive or active.

8. The depository monitoring system integrated with RFID techniques as claimed in claim 1, wherein the input/output interface can be connected to a plurality of external input and output devices.

9. The depository monitoring system integrated with RFID techniques as claimed in claim 1, wherein the RFID readers further comprise an alarm device so that the operator can perform real-time surveillance.

10. The depository monitoring system integrated with RFID techniques as claimed in claim 1, wherein each said carrier is selected from the group consisting of a wafer cassette, a front-opening unified pod (FOUP), a front-opening shipping box (FOSB), a trolley and a probe card box.

11. The depository monitoring system integrated with RFID techniques as claimed in claim 1, wherein the predetermined space is a range in which the RFID tags can be read by any adjacent said RFID reader as radio frequency signals.

12. The depository monitoring system integrated with RFID techniques as claimed in claim 1, wherein each said carrier or semiconductor object is provided with at least one of said RFID tag.

* * * * *